US009423793B2

United States Patent
Wong et al.

(10) Patent No.: US 9,423,793 B2
(45) Date of Patent: Aug. 23, 2016

(54) SYSTEM, METHOD AND COMPUTER PROGRAM FOR PATTERN BASED INTELLIGENT CONTROL, MONITORING AND AUTOMATION

(76) Inventors: Andrew Wong, Waterloo (CA); Chung Lam Li, Waterloo (CA)

( * ) Notice: Subject to any disclaimer, the term of this patent is extended or adjusted under 35 U.S.C. 154(b) by 0 days.

(21) Appl. No.: 13/141,944
(22) PCT Filed: Dec. 23, 2009
(86) PCT No.: PCT/CA2009/001878
§ 371 (c)(1),
(2), (4) Date: Sep. 15, 2011
(87) PCT Pub. No.: WO2010/071998
PCT Pub. Date: Jul. 1, 2010

(65) Prior Publication Data
US 2011/0320388 A1    Dec. 29, 2011

Related U.S. Application Data

(60) Provisional application No. 61/193,781, filed on Dec. 23, 2008.

(51) Int. Cl.
*G06F 15/18* (2006.01)
*G05B 23/02* (2006.01)
(Continued)

(52) U.S. Cl.
CPC ....... *G05B 23/0232* (2013.01); *G05B 23/0278* (2013.01); *G06K 9/6256* (2013.01); *G06K 9/6269* (2013.01); *G06N 5/025* (2013.01); *G06N 7/005* (2013.01); *G06N 99/005* (2013.01)

(58) Field of Classification Search
USPC ............................................................ 706/12
See application file for complete search history.

(56) References Cited

U.S. PATENT DOCUMENTS 6,317,515 B1 * 11/2001 Kurtze et al. ................. 382/166
6,982,708 B1    1/2006 Mah et al.
(Continued)

FOREIGN PATENT DOCUMENTS

CN    1873807 A    12/2006
CN    101196743 A    6/2008
WO    03040882 A2    5/2003

OTHER PUBLICATIONS

International Search Report of the Authorized Searching Authority (Corresponding Application: PCT/CA2009/001878); Canadian Intellectual Property Office; Authorized Officer Chan, Alan; Issued Jan. 7, 2010; (4 pages).
(Continued)

*Primary Examiner* — Kakali Chaki
*Assistant Examiner* — Ababacar Seck
(74) *Attorney, Agent, or Firm* — Norton Rose Fulbright Canada LLP (57) ABSTRACT

The present invention relates to control, monitoring, and automation. The present invention more specifically relates to pattern-based intelligent control, monitoring and automation. The invention performs pattern-based monitoring. It collects signal data from one or more signals. The signal data define signal data streams. It then transforms each of the signal data streams into trends. It also discovers patterns based on the trends within each signal data stream and/or across the signal data streams. The patterns are optionally used for diagnostics and root cause analysis, online plant monitoring and operation control, plant optimization, and other environments where a causal link or correlation may exist between related inputs, states and/or outputs.

20 Claims, 11 Drawing Sheets

(51) Int. Cl.
*G06N 7/00* (2006.01)
*G06N 5/02* (2006.01)
*G06K 9/62* (2006.01)
*G06N 99/00* (2010.01)

(56) References Cited

U.S. PATENT DOCUMENTS

| | | | |
|---|---|---|---|
| 7,089,592 B2 | 8/2006 | Adjaoute | |
| 7,143,007 B2 | 11/2006 | Long et al. | |
| 7,357,298 B2* | 4/2008 | Pokorny et al. | 235/375 |
| 8,180,724 B1* | 5/2012 | Qureshi et al. | 706/50 |
| 8,403,881 B2* | 3/2013 | Ferren et al. | 604/65 |
| 2003/0009399 A1* | 1/2003 | Boerner | 705/35 |
| 2005/0182306 A1* | 8/2005 | Sloan | 600/300 |
| 2006/0015294 A1 | 1/2006 | Yetter, Jr. et al. | |
| 2006/0047216 A1* | 3/2006 | Dorr et al. | 600/521 |
| 2006/0101402 A1 | 5/2006 | Miller et al. | |
| 2006/0274864 A1* | 12/2006 | Ohama et al. | 375/344 |
| 2007/0010900 A1* | 1/2007 | Kavaklioglu et al. | 700/26 |
| 2007/0022079 A1* | 1/2007 | Benson et al. | 706/59 |
| 2007/0027888 A1* | 2/2007 | Avergun et al. | 707/101 |
| 2007/0028220 A1 | 2/2007 | Miller et al. | |
| 2007/0100779 A1 | 5/2007 | Levy et al. | |
| 2008/0313006 A1* | 12/2008 | Witter et al. | 705/9 |
| 2010/0057736 A1* | 3/2010 | Srinivasan et al. | 707/6 |

OTHER PUBLICATIONS

Written Opinion of the International Search Authority (Corresponding Application: PCT/CA2009/001878); Canadian Intellectual Property Office; Authorized Officer Chan, Alan; Issued May 17, 2010; (5 pages).

The State Intellectual Property Office of the People's Replublic of China, Office Action dated Jan. 22, 2015 issued on Chinese Application No. 200980152331.4.

Chen, Lei; Similarity Search Over Time Series and Trajectory Data; University of Waterloo; Dec. 31, 2005; Waterloo, Ontario, Canada.

Yu, Jingwen et al.; Comparison of Distance Measures in Evolutionary Time Series Segmentation; Third International Conference on Natural Computation, Aug. 24, 2007; IEEE Computer Society; Piscataway, New Jersey, USA.

Bulut, Ahmet et al.; A Unified Framework for Monitoring Data Streams in Real Time; ICDE 2005 Proceedings of the 21st International Conference on Data Engineering; Apr. 5, 2005; IEEE Computer Society; Washington, DC, USA.

European Patent Office, Supplementary European Search Report dated May 21, 2013, issued on European Patent Application No. 09833983.

State Intellectual Property Office, Office Action dated Aug. 19, 2013, issued on Chinese Patent Application No. 200980152331. 4(english translation provided).

State Intellectual Property Office, Office Action dated May 9, 2014, issued on Chinese Patent Application No. 200980152331.4(english translation provided).

Canadian Intellectual Property Office, Office Action for corresponding CA Application No. 2,748,165 dated Jan. 22, 2016.

State Intellectual Property Office, Office Action for corresponding CN Application No. 200980152331.4 dated Oct. 8, 2015.

\* cited by examiner

| S_code | Indicant | Target TS | Suspected Cause TS |
|---|---|---|---|
| s0 | PRC-6 | | |
| s1 | PR-37 | | |
| s2 | PR-38 | 2 | 14,15,25,39,43 |
| s3 | PR-37A | | |
| s4 | PR-38A | | |
| s5 | PRC-16 | | |
| s6 | PRC-16A | | |
| s7 | PR-13 | | |
| s8 | PR-13A | | |
| s9 | PR-14A | | |
| s10 | PR-14 | | |
| s11 | PIC-001 | | |
| s12 | PRC-8 | | |
| s13 | PR-15 | | |
| s14 | FIC-17/1 | | |
| s15 | FIC-17/2 | | |
| s16 | FIC-004 | | |
| s17 | TI-15-77 | | |
| s18 | FIC-010 | | |
| s19 | LRC-1 | 19 | 48,49 |
| s20 | TR-15-2 | | |
| s21 | TR-15-3 | | |
| s22 | TR-15A-2 | | |
| s23 | TR-15A-3 | | |
| s24 | TRC-1 | | |
| s25 | TRC-3 | | |
| s26 | TRC-1A | | |
| s27 | TRC-3A | | |
| s28 | TR-15-17 | | |
| s29 | TR-15-18 | | |
| s30 | TR-15A-18 | | |
| s31 | TR-15A-17 | | |
| s32 | TR-15-19 | | |
| s33 | TR-15-20 | | |
| s34 | TR-15A-19 | | |
| s35 | TR-15A-20 | | |
| s36 | TRC-5 | | |
| s37 | TIC-001 | 37 | 16,17,18 |
| s38 | FRC-1/1 | | |
| s39 | FRC-1/2 | 39 | 2,14,15,38,40,41,43 |
| s40 | FRC-1A/1 | | |
| s41 | FRC-1A/2 | | |
| s42 | FRC-4 | | |
| s43 | FRC-5 | | |
| s44 | FRC-4A | | |
| s45 | FRC-5A | | |
| s46 | FIC-001 | | |
| s47 | FIC-009 | | |
| s48 | FQ50 | | |
| s49 | FR-18 | | |
| s50 | LRC-2 | | |
| s51 | LRC-3 | | |
| s52 | LIC-24 | | |
| s53 | LIC-001 | | |
| s54 | LIC-002 | | |
| s55 | LIC-003 | | |
| s56 | LIC-004 | | |
| s57 | LI-006 | | |
| s58 | LRC 10 | | |
| s59 | LRC-11 | | |
| s60 | LRC-25 | | |
| s61 | LRC-26 | | |
| s62 | LRC-22 | | |
| s63 | LIC-15 | | |

Discovered Patterns Associated with Target Patterns s15:FU-0-s25:FD-2-s2:UUUFD
s15:FFU-1-s25:FD-1-s2:UUFU
s15:FU-1-s25:FD-1-s2:UUFU
s25:FFFUU-3-s2:DFUUU
s25:FFUU-3-s2:DFUUU
s25:FFFU-3-s2:DFUUU
s25:FUU-3-s2:DFUUU
s25:FFU-3-s2:DFUUU
s25:FU-3-s2:DFUUU
s25:FFFUU-2-s2:DFUUU

S2: 14, 15, 25, 39, 43 s17:FD-2-s18:FD-1-s37:DDUUU
s18:FU-2-s18:DF-0-s37:DDUUU
s18:FUU-1-s18:DF-0-s37:DDUUU
s18:FU-1-s18:DF-0-s37:DDUUU
s17:DF-2-s17:FU-1-s37:UFDUU
s17:DFF-1-s17:FU-1-s37:UFDUU
s18:UF-3-s16:FUU-1-s37:UUUFF
s18:FU-2-s18:DFU-0-s37:DUUU
s16:UFFF-2-s18:FU-0-s37:DUUU
s16:UFFFF-1-s18:FU-0-s37:DUUU

S37: 16, 17, 18 s48:UF-2-s49:UUF-0-s19:FUUU
s49:DUF-2-s19:FFUUU
s49:DUFF-1-s19:FFUUU
s48:FFDD-3-s19:FFUUU
s48:FDD-3-s19:FFUUU
s49:DUUF-0-s19:FUUUU
s48:DUU-2-s19:FUUUU
s49:FDUU-1-s19:UUUFF
s49:DUU-1-s19:UUUFF
s49:DUUF-0-s19:UUUFF

S19: 48, 49 s40:FU-1-s2:DFF-0-s39:FFUUU
s15:DF-1-s15:FU-0-s39:UUUUD
s15:FD-1-s15:FFU-1-s39:UUUD
s15:FFD-2-s15:FU-1-s39:UUUD
s15:FD-2-s15:FU-1-s39:UUUD
s15:DF-1-s15:FU-1-s39:UUUD
s40:FFD-2-s41:DFF-1-s39:UUUF
s38:DFU-3-s41:DFF-1-s39:UUUF
s40:FFD-2-s41:DFFF-0-s39:UUUF
s40:FD-2-s41:DFFF-0-s39:UUUF

SYSTEM, METHOD AND COMPUTER PROGRAM FOR PATTERN BASED INTELLIGENT CONTROL, MONITORING AND AUTOMATION

FIELD OF THE INVENTION

The present invention relates to control, monitoring and automation. The present invention more specifically relates to pattern-based intelligent control, monitoring and automation.

BACKGROUND OF THE INVENTION

Production intelligence is an emerging new field. Production intelligence aims at solving problems including monitoring process operations and alerting operators to an event or alarm; identifying the potential causes of an event; and suggesting possible remedial actions to operators.

Production intelligence can be applied to any field that includes one or more auto-correlated or cross-correlated data. One such field is manufacturing. In manufacturing processes such as oil sand extraction, processing circuits, oil refinery, delay coking, energy and utility, mineral and metal production, power generation, and biofuel/food production, the processes are operated by domain experts (e.g. oil sand plant operators, chemists and geographers) equipped with knowledge in their fields. However, a manufacturing process can be highly complex. It consists of many subcomponents, each of which has multiple inputs, states and outputs. It is not uncommon for a process to have more than 500 sensors recording temperatures, flows, pressures, liquid levels, PH values, etc. in real times.

In the past ten years, advancement in sensor and wireless technology has enabled process engineers to acquire data that were unavailable previously. However, it is very challenging to turn this huge volume of data into valuable information. When process engineers or plant managers are challenged to find the root cause of a problem, or look for ways to improve the process, current systems yield very little information on their own. Reports show "what" has happened, but offer little insight into "why" that happened. The amount of data that is generated by sensors and the complex interactions that occur between process parameters is overwhelming. Hence, it is virtually impossible for a human, who by nature can only comprehend a problem in several dimensions, to effectively analyze such a complex multivariate problem.

The prior art in production intelligence includes neural networks, self-organizing maps, support vector machines, decision trees, pattern discovery, motif discovery, naïve Bayesian and Gaussian mixture model (GMM).

Neural network is a black-box approach where the operators cannot understand why and how it does the analysis and predictions. Hence, neural network cannot be used for decision supports. It has been used in automatic control with limited success. The major problem is that it is easy for a neural network to overfit the data (i.e. memorize the noises in the system) and yet the operators still do not know the problem. In practice, it is very difficult for a operator to determine whether the results generated from neural network can be trusted or not because it is a black-box and it is not trivial to determine whether it is over-fitting or not. Self-organizing map (SOM) is another type of neural network. It is a clustering technique that groups similar data points into clusters. However, the clusters generated are difficult to interpret. Also, SOM does not consider times in its model generation.

Support vector machine is a variant of neural network. It has been proven to be more accurate than neural network. However, the problem of black-box and over-fitting still exist. Decision tree is more transparent than neural network and support vector machine. However, it is easy for a decision tree to grow overwhelmingly large and hence its interpretation is still very challenging for an operator. Furthermore, decision tree only works in supervised learning environment (each data point must have a class label). However, many manufacturing processes are unsupervised by nature.

Pattern discovery has been successfully used in oil sand processes for over a decade. Nevertheless, it has two major problems. First, it does not take into account any time information in the data. Second, the number of patterns it generates is huge.

Motif discovery was originally developed in bioinformatics for gene and protein sequences. Later, it has been used for time series data. Motif discovery has mainly applied to well-structured data such as DNA and protein sequences. When applied to real world sensors data, it does not handle noise effectively. In addition, the rich prior knowledge in DNA and proteins is usually not available in complex manufacturing domains. This limits the use of motif discovery in production intelligence.

Naïve Bayesian utilizes a simple assumption that all sensors are conditionally independent given the target sensors. Thus, Naïve Bayesian is very fast and memory efficient. However, it is not very accurate depending on how seriously this assumption is violated. Naïve Bayesian suffers from the same problem of decision tree in that it only works in a supervised learning environment.

Gaussian mixture model (GMM) uses multiple Gaussian kernels to fit the data. It is also a black-box approach where results are difficult to comprehend. In addition, it is easy to overfit a data set with GMM. The main advantage of GMM is its computation efficiency.

SUMMARY OF THE INVENTION

The present invention provides a computer-implementable method for pattern-based monitoring, the method characterized by the steps of: (a) collecting signal data from one or more signals defining signal data streams; (b) transforming each of the signal data streams into trends; and (c) discovering, or facilitating the discovery of, by one or more computer processors, patterns based on the trends within signal data stream and/or across the signal data streams.

The present invention also provides a system for pattern-based monitoring, characterized in that the system comprises: (a) a data collection utility for linked to one or more signals, wherein the data collection utility collects signal data from the signals to defining signal data streams; and (b) a data mining utility for transforming each of the signal data streams into trends and discovering patterns based on the trends within each signal data stream and/or across the signal data streams.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DETAILED DESCRIPTION

Overview

The invention provides a system, method and computer program for pattern-based intelligent control, monitoring and automation. The invention is operable to discover patterns that are correlated within and/or across one or more signals. The patterns that are discovered may be patterns that were previously unknown or hidden. The invention can transform one or more of the collected signals into trends and discover patterns based on the trends. The invention, in real time or near real time, can apply the resulting knowledge to (1) identify probable root causes of the trends or patterns, or (2) identify newly collected data that may exhibit similar attributes to those associated with the trends or patterns so as to monitor and control the system where data is collected based on the trends or patterns. The invention, therefore, can be used to monitor the data, send to operators one or more alerts/warnings for possible events (for example undesirable events) and provide to operators recommendations to for example avoid/mitigate/remedy the problems. The operators can verify the alerts/warnings to determine if a problem has arisen or is arising or verify that the root causes are in fact root causes. The operators are provided with means for eliminating irrelevant factors when investigating a problem. Processes can also be automated such that they are responsive to the recommendations provided.

The invention may be applied to any continuous process that comprises one or more processes that may be dynamically interrelated. The invention may be used to discover the interrelations. Possible, but non-limiting, areas of application include production intelligence in manufacturing processes such as oil sand extraction and processing circuits, oil refinery, delay coking, energy and utility, mineral and metal production, power generation, and biofuel/food production. The invention can be used for training or enhancing the knowledge of system process operators, such as process engineers or technicians, helping them to avoid making mistakes and find key factors to improve process performance, environment management and safety.

The invention may be implemented to provide an intelligent process control and monitoring system, which may for example be used in: (i) diagnostics and root cause analysis; (ii) online plant monitoring and operation control; (iii) plant optimization; and (iv) other environments where a causal link or correlation may exist between related inputs, states and/or outputs.

The invention is operable to enable relations across time and multiple signals to be discovered automatically without relying on prior knowledge or models. Relations may be discovered and may be displayed via a user interface to an operator to explain the underlying models, for example to explain or propose causal links. An operator may apply this knowledge to improve the underlying models by changing operation sequences, control parameters, etc. The signal data can be collected from one or more processes that may be aggregated from different sites or facilities.

In one implementation, the method of the invention includes: (i) collecting signal data streams from one or more signals; (ii) transforming each of the signal data streams into trends; and (iii) discovering, or facilitating the discovery of, by one or more computer processors, patterns based on the trends within each signal data stream and/or across the signal data streams.

Figure 2:
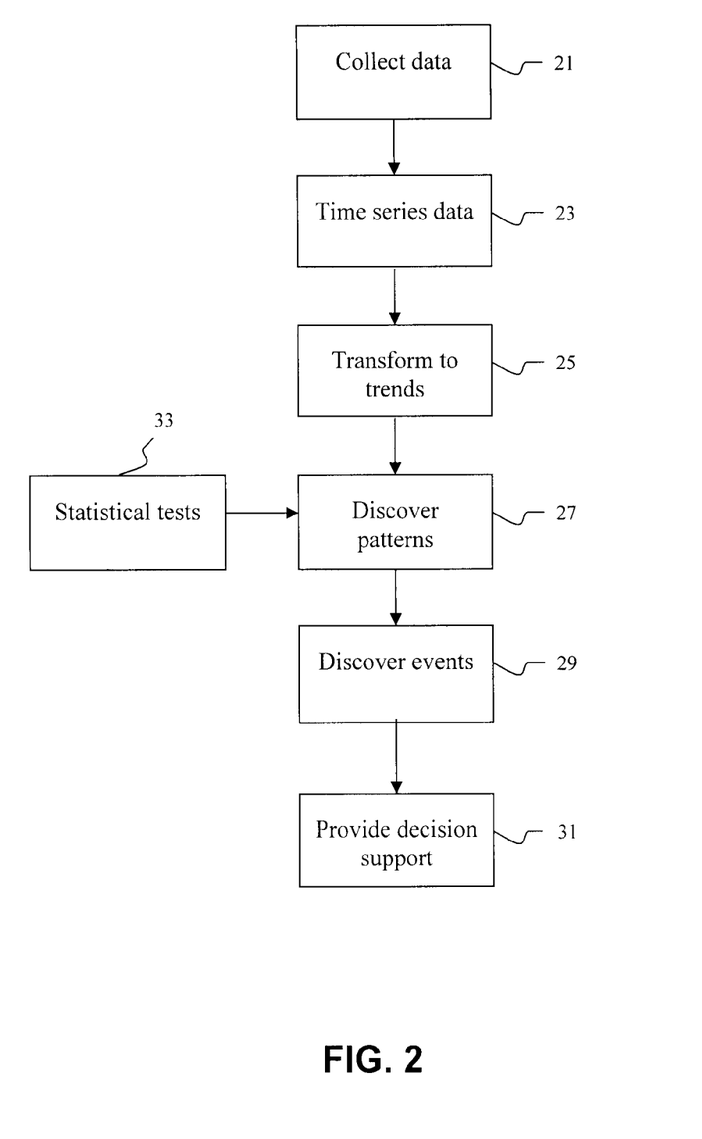
FIG. 2 illustrates a method in accordance with the present invention.

FIG. 2 illustrates a method in accordance with the present invention. The method may include: (i) collecting signal data 21 from one or more signals; (ii) time stamping 23 each of the collected signal data points to define signal data streams and storing the signal data streams to a database such as a relational database or object-oriented database wherein similarly or same time stamped signal data points for each signal are correlated; (iii) transforming, in real time or near real time, the signal data streams into trends 25; (iv) discovering patterns 27 based on the trends within an individual signal data stream and/or across signal data streams; (iv) determining, based on patterns presently discovered, events that are likely to occur 29; and (v) optionally providing decision support 31, such as by alerting an operator to take corrective action based on the events. The discovery of patterns may be made in accordance with one or more statistical tests 33.

It should be understood, that depending on the application (and associated parameters) of the technology described in this invention, decision support provided as described herein, may be linked to an automated process or for example use of a software agent, in addition to or instead of a human operator. For example, a control system may respond to discovered patterns by controlling one or more inputs to a system and/or to control one or more resulting outputs of a system.

The invention may be implemented as software or as hardware, such as an integrated circuit, having an interface for receiving signal data from one or more devices, inputs, states and/or outputs. The software may be executable on one or more computer processors linked to a computer system or could be provided on a distributed computer system, which may for example be desirable for receiving signal data from a plurality of physically distant devices, inputs, states and/or outputs. The hardware may be linked to a computer system or display for providing a user interface. The invention may also be linked to a web server for enabling web access to a user interface that provides access to the pattern data generated in accordance with the method of the present invention.

Figure 1:
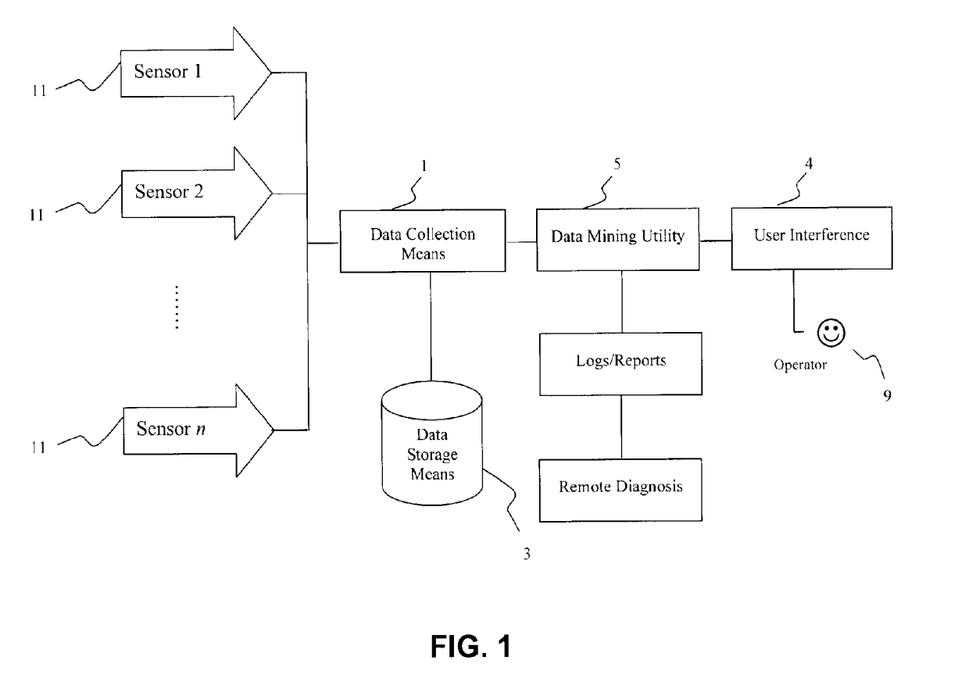
FIG. 1 illustrates a system in accordance with the present invention.

FIG. 1 illustrates a system in accordance with the present invention. One system that can be implemented in accordance with the invention comprises a data collection means 1, a data storage means 3 that implements a database such as a relational database or object-oriented database, a data mining utility 5, and a dashboard user interface 7 for alerting an operator 9 of one or more devices or systems that are being monitored by inputs, states and/or outputs. A remote diagnosis means may be provided for enabling an operator to diagnose the system remotely using, for example, logs and reports generated by the system.

A data collection means 1 includes or is linked to one or more sensors 11 for one or more devices, systems, inputs, states, and/or outputs for providing signal data. The signal data may be continuous, discrete and mixed-mode data.

Each signal data may be provided as a signal data stream comprising a plurality of data points, which may correspond to a pre-determined sampling rate. The data collection means associates a time stamp to each collected signal data point of each signal data stream. The one or more signal data streams may be correlated by the time stamps assigned to the signal data points by the data collection means.

A data storage means may implement a database such as a relational database or object-oriented database. For example, each of the signal data streams may be correlated to other signal data streams based on the time stamps assigned to the signal data points such that a signal data point in one signal data stream may be linked to a signal data point in all other signal data streams that occur or occurred at the same time stamp. This enables the signal data streams to be related to each other.

A data mining utility, in accordance with the present invention, provides intelligent control and monitoring by the discovery of patterns within and/or across signal data streams. Each of the signal data streams may be transformed into event sequences of moving trends. For example, the trends may reveal the process behaviour of the signal data streams. In one example, the moving trends may be selected from the group: {down (D), flat (F), up (U)} where down indicates a decrease, flat indicates no change or relatively little change, and up indicates an increase in the signal data stream at the signal data point. It should be understood that any number of levels can be provided, such as {high D, mid D, low D, high F, mid F, low F, high U, mid U, low U}, etc. These levels of transformation enable the data mining utility to not only capture trends but also the duration of events and time between events, and event levels rather than variable levels.

The data mining utility of the present invention may further discover patterns in moving trends. The discovery of patterns may be made in accordance with one or more statistical tests. For example, a statistical test can be based on the confidence of a pattern, which is defined as the conditional probability of the pattern. Other statistical tests can also be used. The statistical tests may be configured for discovering patterns in accordance with particular false positive and false negative rates. This may be desirable based on the knowledge level of the process, or the desire to learn and explore possible root causes discovered by the invention. For example, a high false positive and low false negative rate may be desired.

The data mining utility may define patterns within an individual signal data stream and across signal data streams. For example, a particular event sequence, comprising a series of moving trends, may occur frequently in a single signal data stream. The particular event sequence may be referred to as a sequence pattern (or pattern). Furthermore, two close sequence patterns of signal data streams may be determined to be statistically interdependent and may define second order auto correlated patterns. In addition, two sequence patterns of different signal data streams may be determined to be statistically interdependent and may define cross-correlated patterns. Still further, multiple signal data streams can reveal a causal pattern in one signal data stream resulting in a target pattern in another signal data stream.

A dashboard user interface may enable one or more operators or monitors (hereinafter "operators" although the operators are not required to provide instruction to the system) to access and view collected data, trends, patterns, recommendations, etc. as provided by the system. For example, the operator may be an operator of a device from which signal data is collected. The user interface may be operable to alert the operator of events that are likely to occur based on the discovered patterns and the currently collected signal data. This enables real-time monitoring and preventive alerting, for example in the case of a likely system fault. The operator may also navigate the dashboard user interface to view historical data, trends, patterns, etc. defining user cases, analytics regarding the data, trends, patterns, recommendations, alerts, etc., and causal links for events. The web server mentioned above may provide access to collected signal data streams, trends, patterns, recommendations, etc. stored remotely via a database, and accessed locally via the dashboard user interface. The web server may aggregate signal data streams, trends, patterns, recommendations, alerts, etc. across multiple devices or systems, and multiple locations for devices or systems.

One possible application of the invention is to apply the technology described to multiple signals expressed as multivariate time series. In this case, the data contains a series of continuous values and each value is associated with equally spaced timestamps, defining a plurality of time series. Application of the invention in relation to multivariate time series may result in generation of wrong/misleading patterns, unless precautions are taken known to those skilled in the art. In particular, it is important that at least one of the time series be adjustable (e.g. an analog control), and there could be multiple adjustable signals. The patterns discovered in accordance with the invention may be used by the operator to monitor and control a plant, for example. However, wrong/misleading patterns may be generated when there are no discrete-valued signals in the data. Hence, pattern data generated as a result should be used subject to precautions such as operator caution in relying on the data.

Trends

Collected signal data streams may be transformed to trends by the data mining utility. The trends may be a common piecewise linear representation of the signal data streams. For example, the trends may represent relationships between and across one or more signal data points in the signal data streams.

The trends may reveal the process behaviour of the signal data streams based on events, duration of events, time between events, and event levels rather than variable levels.

These relationships can be thought of as "lines" across one or more of the signal data points. For example, the signal data points can be grouped into groupings of a predetermined number, and a line can be represented across the group of points based on its slope. For example, given a series of the nine signal data points: {1, 1, 1, 2, 3, 4, 5, 1, 0}, groups can be made of three points each. Lines can be represented across the groups, such as points {1, 1, 1} represented by line 1 of slope 0 (slope=0/2=0); points {2, 3, 4} represented by line 2 of slope 1 (slope=2/2=1); and points {5, 1, 0} represented by line 3 with slope −2.5 (slope=−5/2=−2.5).

A trend may be defined based on the line that represents each group of signal data points. For example, line 1 may assigned as a flat trend (F) based on its zero slope. Line 2 may be assigned an uptrend (U) based on its positive slope. Line 3 may be assigned a downtrend (D) based on its negative slope.

For a flat trend, the average signal data point value contained in the line may represent its magnitude. For example, the average value of the signal data points in line 1 is (1+1+1)/3=1. Thus, its magnitude may be 1. Using the magnitude, the flat trends can be further subdivided into finer trend levels. For example, a flat trend may be divided into high F, mid F and low F.

Furthermore, for an uptrend or downtrend, finer trends may be based on slope. For example, an uptrend may be subdivided into rapidly uptrend (rapid U) and steadily uptrend (steady U). Similarly, a downtrend may be subdivided into rapidly downtrend (rapid D) and steadily downtrend (steady D).

Further trends and subdivisions of the trends may be provided based on any statistical property, such as mean, median, standard deviation, second derivative, nth order moments, entropy, self information, correlation matrix, etc.

The particular threshold levels to determine which of the divided and subdivided trends is assigned may vary based on the application and be configured by an operator using the user interface.

Pattern Discovery

Patterns may be discovered from the trends by the data mining utility. The patterns may be used to (1) capture the duration of an event and the delay between events; (2) provide event levels instead of variable levels to revealed more specific information that previously possible; (3) provide transparent and understandable links; (4) provide a statistically robust methodology without risk of overfitting; (5) effectively handle missing values, noises, errors and uncertainty in the collected data; (6) provide scalability for large volumes of data; and (7) provide actionable intelligence.

The data mining utility may define patterns within an individual signal data stream and across signal data streams.

Figure 3:
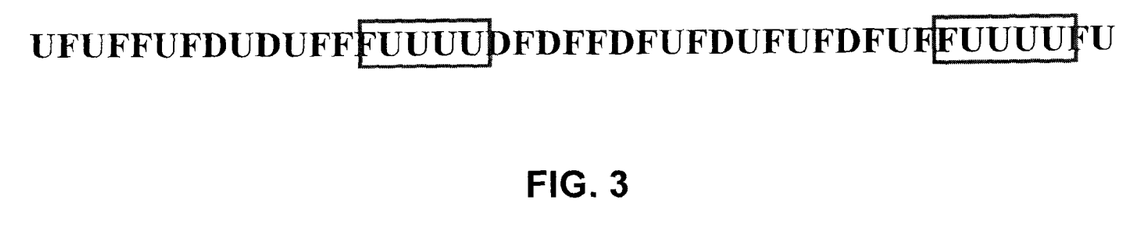
FIG. 3 illustrates a sequence pattern.

FIG. 3 illustrates a sequence pattern. A sequence pattern may be a discovered in signal data stream having a series of moving trends that occur frequently. The data mining utility may enable the frequency defining a sequence pattern to be configured. The data mining utility may also enable the number of signal data points required to define a sequence pattern to be configured.

Figure 4:
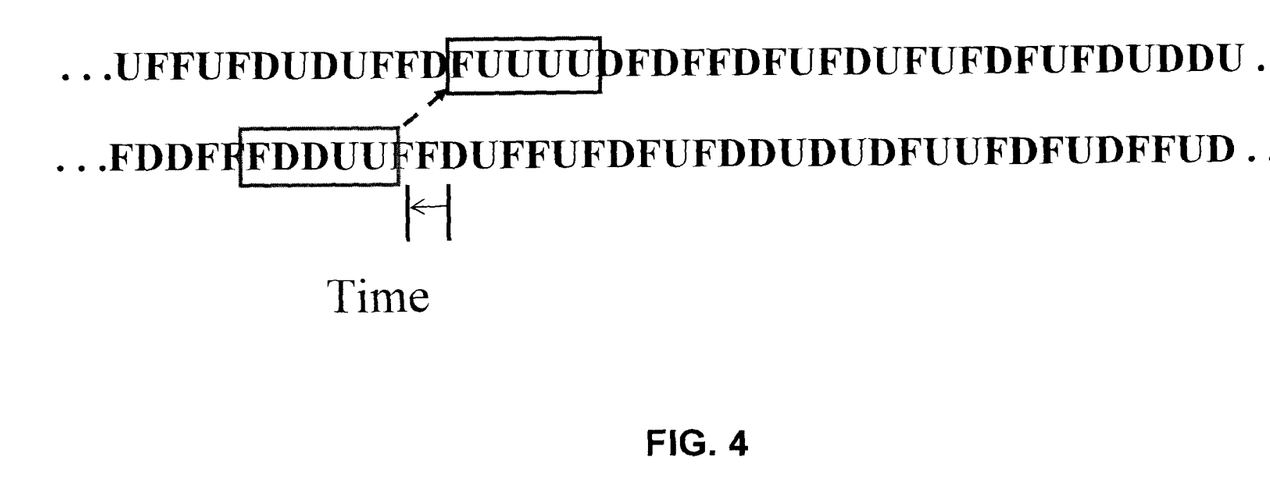
FIG. 4 illustrates second order auto correlated patterns.

FIG. 4 illustrates second order auto correlated patterns. These patterns may be discovered in two close sequence patterns of a signal data stream that display statistical interdependence. They may be further referred to as cross-correlated patterns. The second order auto correlated patterns may be correlated based on a particular time delay or time delay range. The statistical interdependence required for defining auto correlated patterns may be configurable in the data mining utility.

Figure 5:
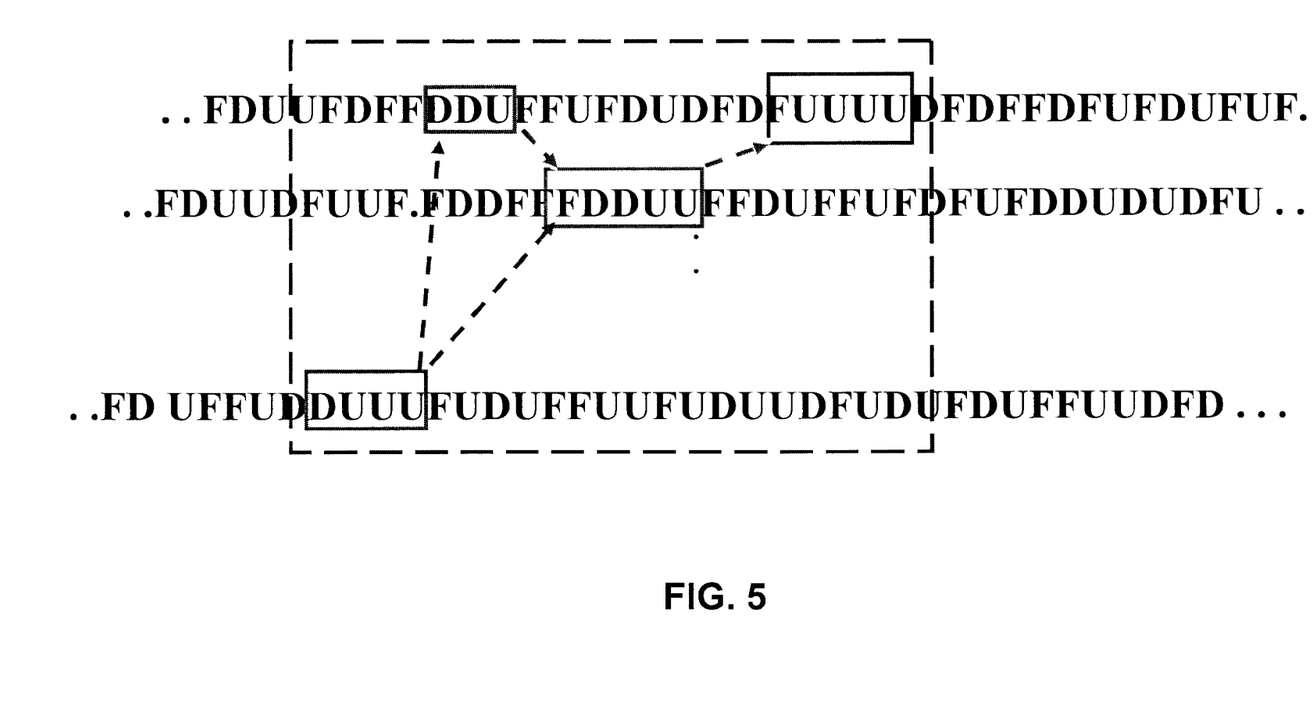
FIG. 5 illustrates a causal pattern.

FIG. 5 illustrates a causal pattern. A causal pattern may be discovered across two or more time signal data streams, each having close sequence patterns displaying statistical interdependence. A causal pattern may be based on one or more auto correlated patterns. Pattern discovery enables the definition and generation of target patterns. The target patterns may be part of correlated patterns in which other patterns have occurred previous to the target patterns. Thus, the data mining utility may be operable to discover causal patterns based on the occurrence of target patterns.

Decision support may be provided based on occurrence of target patterns and discovery of causal patterns. For example, upon the transformation of a trend that has been determined to be a causal link to a target pattern, an alert may be provided to an operator via the user interface. The operator may take corrective action based on this knowledge and may be able to discover whether the suspected causal pattern is in fact part of a causal link and, if so, whether there may be means by which to avoid or to ensure triggering the target pattern, as the case may be, such as by controlling process parameters.

Dashboard

Process engineers require useful information about operational parameters, operating characteristics and conditions of processes for further analyzing the process behaviours and controlling process operations. A holistic and contextual view of the operational flow of the process data can be grasped and analyzed in a succinct and straightforward manner by rendering useful information for effective decision support in the feed forward process control, the root cause analysis and performance analysis.

The user interface may display textual and graphical representations of trends and discovered patterns to an operator. Examples are provided below. These representations provide: 1) a realization of a data driven approach to optimize industrial process operations based on the valuable knowledge discovered from the data; and 2) the provision of an easy-to-understand and actionable system in revealing the underlying patterns in support of decision making and operations of operators in a complex process environment.

Figure 8:
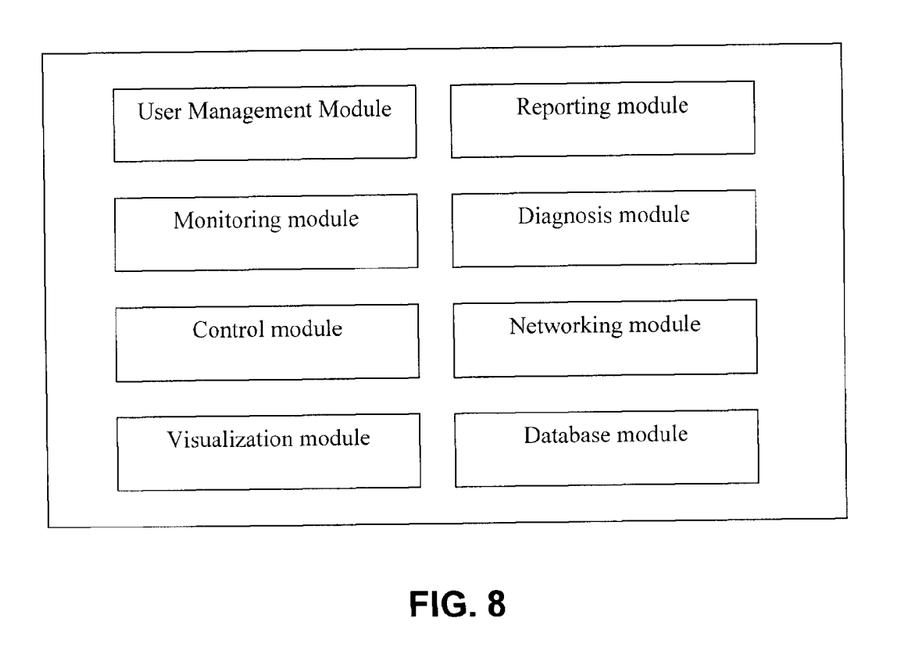
FIG. 8 illustrates a dashboard user interface.

FIG. 8 illustrates a representative embodiment of a dashboard user interface in accordance with the present invention. The dashboard may include, but is not limited to, a user management module, monitoring module, control module, visualization module, reporting module, networking module and database module. The user management module may be used to manage operator authentication, settings, preferences, etc. in order to enable the dashboard to be used by one or more operators. Operator settings may be saved to the data storage means or a server. The monitoring module may monitor the sensors of the process from which data is collected. If events/problems are detected, the monitoring module may provide alerts/warnings on the dashboard or by a popup dialog box, email, instant message, connected LED lights, phone, etc. The control module may enable the operator to control the system or process so as to optimize a process, for example to avoid problems, accidents and/or failures in accordance with recommendations provided by the system. The visualization module may enable an operator to visualize textual, tabular or graphic representations of the collected data, trends and patternsin charts, plots, graphs, tables, diagrams, etc. The reporting module may generate periodic reports (e.g daily/weekly/monthly/yearly, etc.) of process performance, problems occurred, actions taken, etc. The networking module may be used to connect the system to an intranet or internet for communicating signal data, trends and patterns, send alerts/warnings, send control signals, etc. to another remote system. The database module may connect the system to a database such as a relational database or object-oriented database for obtaining historical data. The database may also be used as a means to store reports and logs.

EXAMPLES

The following is provided by example only and is not intended to limit the present invention in any way.

The invention may be applied to the field of delay coking. Delay coking is one process implemented in oil refineries. Commonly, there may be tens to hundreds of sensors in a delay coking process. Data may be sampled every minute. Over the course of a week, therefore, there may be millions of data points, resulting in a huge data set.

Figure 6:
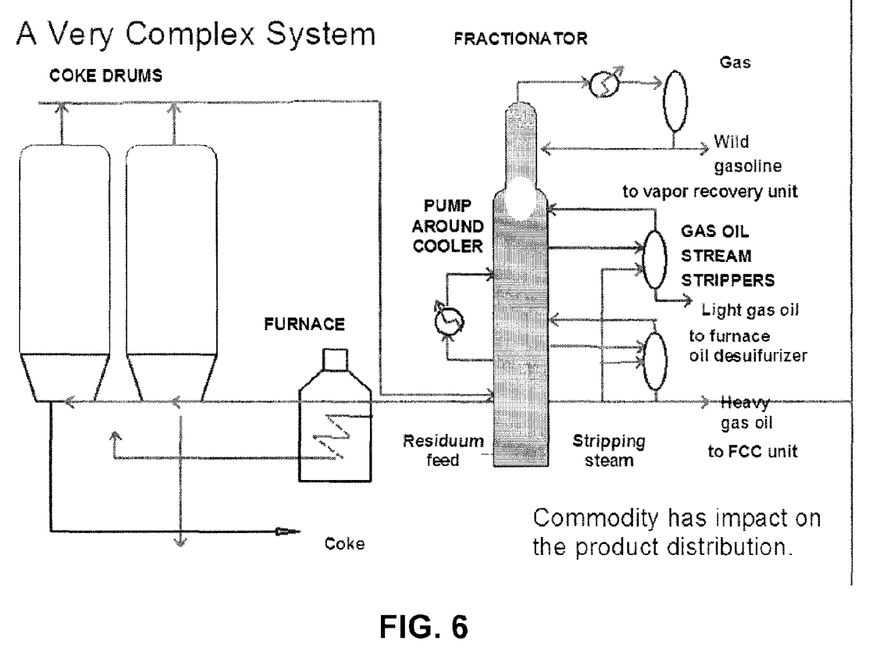
FIG. 6 illustrates an example of a delay coking apparatus.

FIG. 6 illustrates an example of a delay coking apparatus. Sensors linked to the system of the present invention may include pressure, flow speed, temperature, liquid (oil), and manual control sensors of the apparatus. Some sensors, for example, could be oil level of a buffer tank, oil input, oil output, indicator temperature, steam flow, tower temperature, and tower input.

The system may collect signal data streams from each sensor and transform the signal data streams to trends. Patterns may be discovered from the trends. The user interface may enable operators to select one or more signal data stream of interest and specify constraints to generate target patterns on the target signal data stream (for example, "3 to 5 U's after a F on S2"). Based on the set of constraints, target patterns may be generated during the data transformation process.

Figure 7:
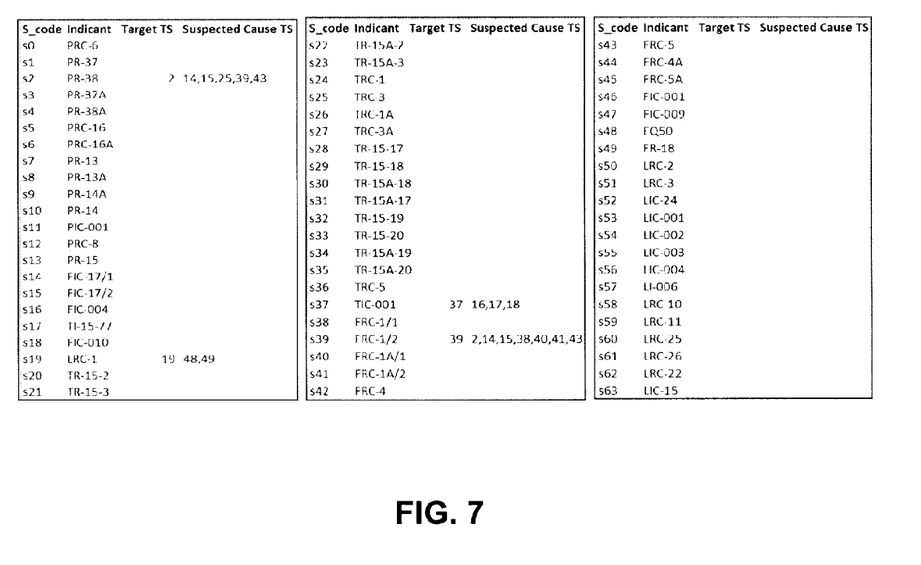
FIG. 7 illustrates a potential user interface output of a root cause analysis resulting from pattern discovery in a delay coking process.

FIG. 7 illustrates a potential user interface output of a root cause analysis resulting from pattern discovery in a delay coking process. For each sensor or signal code (represented by "S code") a target pattern may be discovered and the data mining utility may be operable to indicate to an operator a target signal data stream (represented by "Target TS") in which the target pattern is located. A causal analysis may determine one or more causal links from one or more signal data streams and the data mining utility may be operable to indicate to an operator the one or more signal data streams (represented by "Suspected Cause TS"). Alternatively or in addition, an operator may specify one or more indicants for a S code. One or more of the sensors or signals may be related to other sensors, described by a Suspected Cause TS for example, based on knowledge provided by the operator. These may be referred to as "Indicant". In FIG. 7, "T" may describe "temperature" and "P" may describe "pressure". The operator may not have knowledge of what the particular relation is. For example, as shown in FIG. 7, an operator may designate PR-38 as an indicant for sensor 2 that is related to sensor 14, 15, 25, 39 and 43. However, the operator may not know how exactly they are related.

Figure 9:
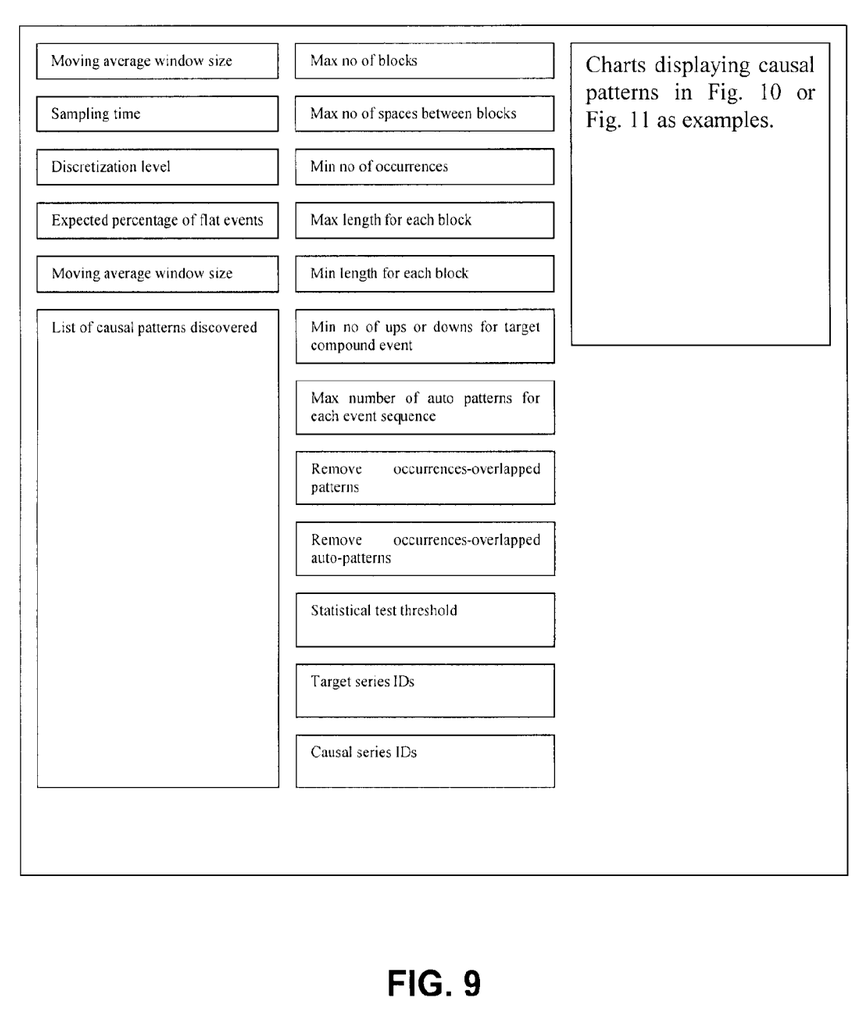
FIG. 9 illustrates another dashboard user interface.

FIG. 9 illustrates a dashboard user interface. An operator may configure the user interface to display graphical analytics resulting from pattern discovery. The operator may configure the user interface, including by specifying a moving average window size, sampling time, discretization interval, expected percentage of flat events and percentage of data used for testing. Moving average window size may be configured to determine the number of samples to use for calculating moving average. It may be applied to the signal data for preprocessing, such as by removing noises. Sampling time may be configured to step determine the sampling rate. Discretization interval may be configured to determine how many signal data points are used to represent one line segment in piecewise linear representation. Expected percentage of flat events may be configured to determine how many percentages of line segments should become flat events. Percentage of data used for testing may be configured to determine the percentage of data used for testing the models generated.

Further parameters may be configured by the operator. For example, the operator may configure the maximum number of blocks a pattern can contain. For example, the pattern [s0=FFF-1->s2=UUU-3->s1=FFU] has three blocks (s0=FFF, s2=UUU and s1=FFU). The maximum number of spaces between blocks can be configured to determine the maximum number of spaces (or delays) between two blocks. For example, the number of spaces between s0=FFF and s2=UUU is 1; the number of spaces between s2=UUU and s1=FFU are 3. The minimum number of occurrences may be configured to determine the minimum number of observed frequency in order to justify that it is not a chance occurrence, in which case it may be used to generate a pattern. The maximum and minimum length for each block may be configured to determine the maximum and minimum number of trends in a block. For example, s0=FFF has three trends (i.e. FFF). The minimum number of ups or downs for target compound event may be configured to determine the minimum number of up or down trends for a compound event (or block) to be considered as a target. The maximum number of auto-patterns for each event sequence may be configured to specify the maximum number of patterns individually discovered from each series. The remove occurrence-overlapped patterns (auto-patterns) may be configured to remove patterns (auto-patterns) that are overlapped. The statistical test threshold may be configured to determine the threshold for the statistical test. The target series IDs may be configured to specify the target sensors. The casual series IDs may be configured to specify the possible related sensors for the set of chosen target sensors.

The user interface may display to the operator the causal patterns discovered in accordance with the configuration. The operator may use these causal patterns to 1) identify possible root causes and 2) eliminate irrelevant factors.

Figure 10:
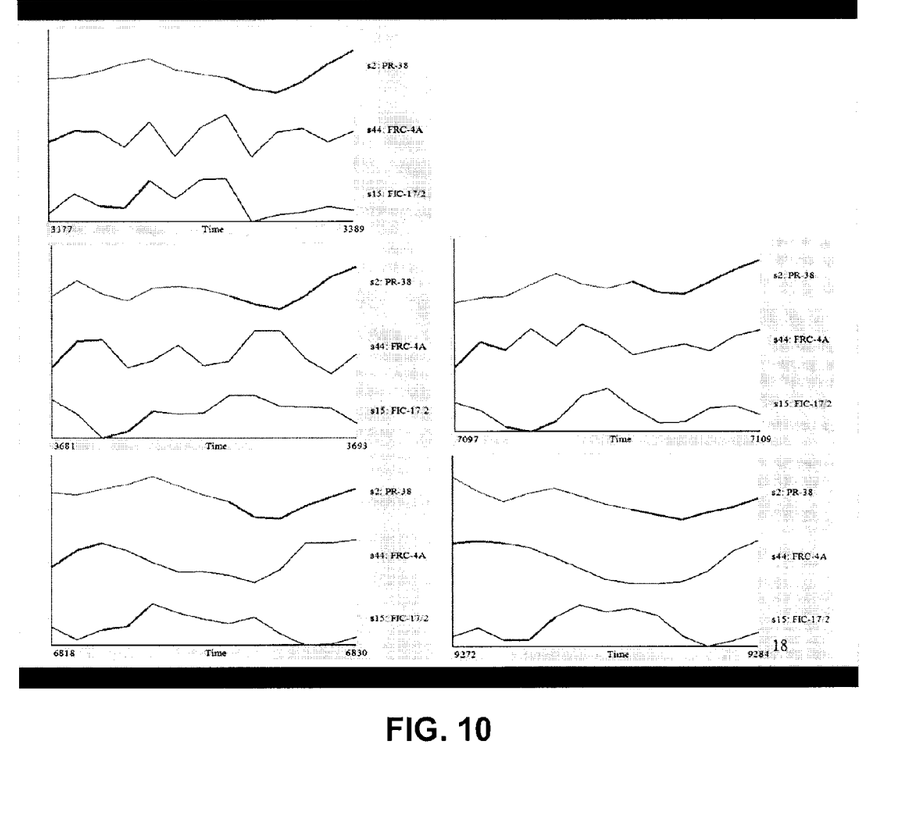
FIG. 10 illustrates graphical representations of three signal data streams without displaying patterns.
Figure 11:
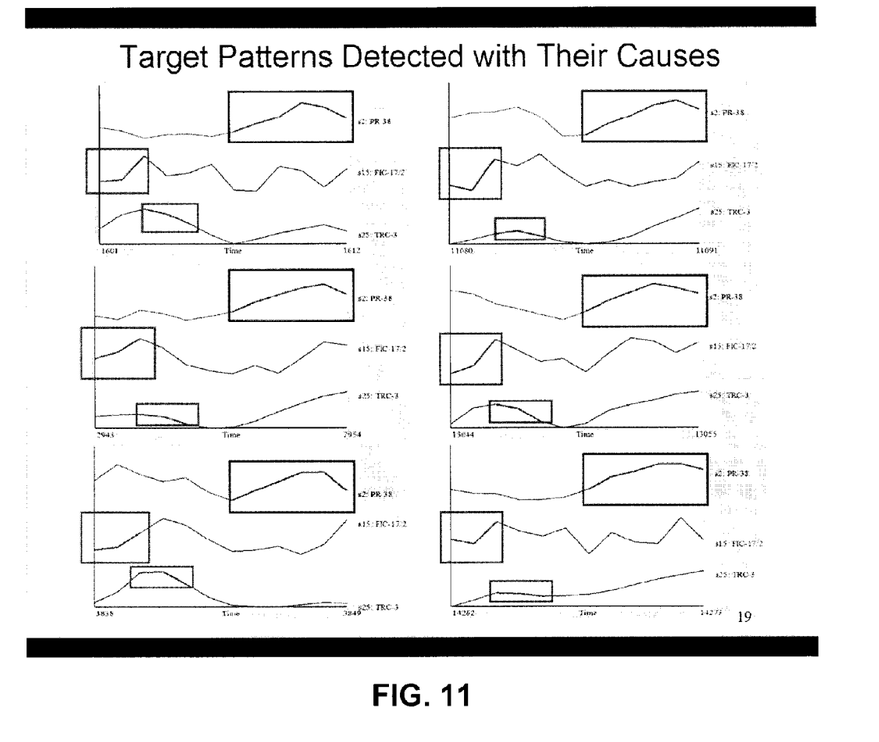
FIG. 11 illustrates graphical representations of three signal data streams displaying patterns.

The user interface may also display to an operator graphical representations of one or more signal data streams including or not including discovered patterns. FIG. 10 illustrates graphical representations of three signal data streams without displaying patterns. FIG. 11 illustrates graphical representations of three signal data streams displaying patterns. In both cases, an axis may correspond to time by time stamp and another axis may correspond to the detected trends of the collected data from each signal data stream.

Figure 12:
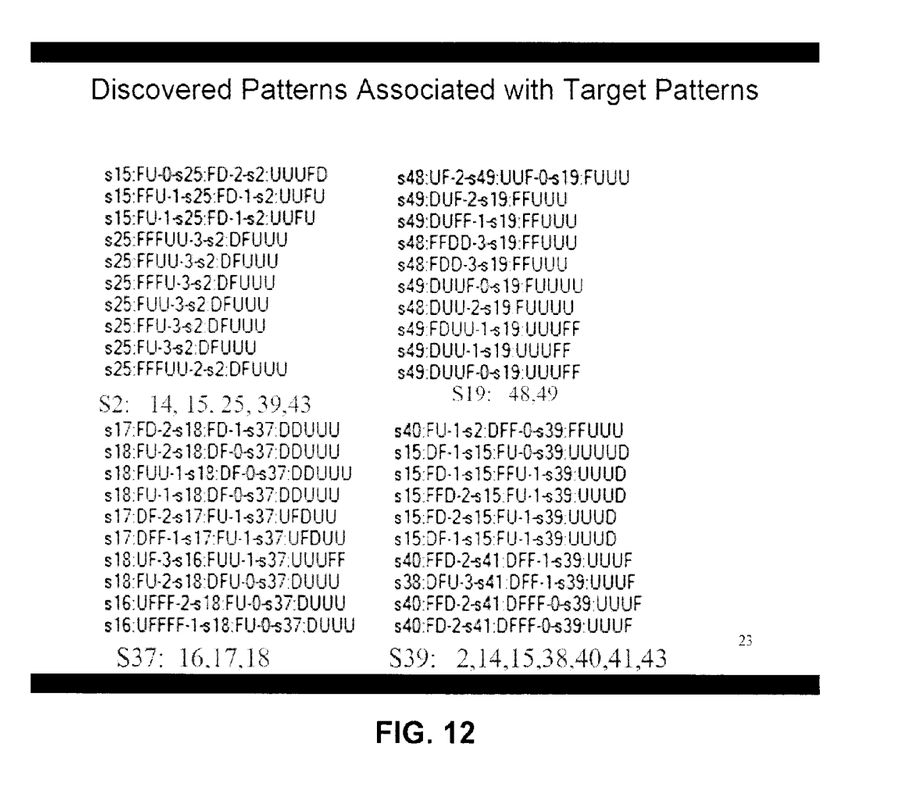
FIG. 12 illustrates the causal links based on patterns between a plurality of signal data streams.

The causal links to target patterns can be viewed by an operator by means of the user interface. For example, FIG. 12 illustrates the causal links based on patterns between a plurality of signal data streams. Trends in each of the involved signal data streams are viewable and the relative correlations within the causal link can be seen. These patterns could display, for example, that the oil level of a buffer tank could be caused or governed by oil input or oil output; or that the indicator temperature could be caused or governed by the steam flow, tower temperature or tower input.

This information may be useful to operators to increase the efficiency and/or reliability of processes. For example, if there is a known time delay between two or more events, an operator can attempt to determine if a change in a process parameter results in a change in the time delay. In another example, an operator can determine whether a previously unknown relationship between two or more sensors is actually related.

For example, the data mining utility may discover that if water temperature is low for two time units then, after a delay of 2 time units, bitumen recovery will drop rapidly for 3 time units. The operator, knowing this pattern, can adjust the water temperature to increase the bitumen recovery.

The present invention can also be applied to a wide variety of manufacturing processes and health industry processes.

For example, the invention can be applied to smart meters. The demands of electricity over different time periods are highly skewed. Peak demand will increase the cost of electricity, generate more pollution and requires more investment on new generation, transmission and distribution infrastructure. To smooth the peak demand, governments have launched projects to record total electricity consumption hour by hour. By use of the present invention, electricity pricing can be based on the time-of-use with on-peak hours more expensive and off-peak hours less expensive. The present invention can apply to the smart meter system and monitor the electricity consumption in real time. It can also send alert or warming for unexpected peak demand. Furthermore, it can be used to identify the causes of peak demands and suggest actions to smooth the demands.

The invention could also be applied to high risk babies monitoring. It can be applied to monitor the condition of pregnancy in real time. It may send alert or warning if conditions (heart rates, blood pressures, etc) of mothers are getting worse. It can also identify possible causes of the problems and suggest actions to remedy the situation. This can be implemented by applied sensors to patients. The sensors collect data such as heart rate and blood pressures in real time. The invention analyzes the data by discovering patterns that potentially leads to risks and suggest possible remedial actions to the doctors.

The invention claimed is:

1. A system for monitoring an industrial process, the system comprising:
   a data collection utility for receiving a plurality of signal data streams from one or more sensors, each signal data stream comprising a series of signal data points representing at least one of an input, an output, and a state associated with a component of the industrial process; and
   a data mining utility for determining a series of trends for each of the plurality of the signal data streams, each trend representing a change between at least two signal data points in the respective signal data stream, and further determining at least one pattern in the plurality of the signal data streams based on the series of trends;
   wherein the at least one pattern comprises a first sequence of trends representing a first event associated with the industrial process, a second sequence of trends representing a second event associated with the industrial process, and a time delay between the first event and the second event; and
   wherein the data mining utility is configured to predict an occurrence of the second event using the determined at least one pattern.

2. The system of claim 1, wherein the data mining utility is configured to determine the at least one pattern based on a detected correlation between the first and second sequences of trends in the plurality of signal data streams.

3. The system of claim 2, wherein the correlation between the first and second sequences of trends is detected based on the time delay.

4. The system of claim 3, wherein the first sequence of trends and the second sequence of trends are detected by the data mining utility to be correlated if: each of the first and the second sequences of trends occurs at least twice, and that each time the occurrence of the second sequence of trends is delayed from the respective occurrence of the first sequence of trends by the time delay.

5. The system of claim 2, wherein the data mining utility is configured to determine the at least one pattern based on a pre-determined value representing a threshold of statistical interdependence between the first and second sequences of trends in the plurality of signal data streams.

6. The system of claim 1, further comprising a user interface for receiving user inputs and for controlling the industrial process, using the series of trends of each of the plurality of signal data streams and the at least one pattern.

7. The system of claim 6, wherein the user interface is configured to generate one or more of: alert, log and report.

8. The system of claim 1, wherein the data collection utility receives the series of signal data points from the one or more sensors at predetermined time intervals and each of the first and second sequences of trends is defined by a plurality of signal data points at consecutive time intervals.

9. The system of claim 1, wherein the trend representing a change between the at least two signal data points in the respective signal data stream comprises a slope defined by the at least two signal data points.

10. The system of claim 1, wherein the trend comprises one of: up, down, and flat.

11. A method for monitoring an industrial process, the method comprising:
    receiving a plurality of signal data streams from one or more sensors, each signal data stream comprising a series of signal data points representing at least one of an input, an output, and a state associated with a component of the industrial process;
    determining a series of trends for each of the plurality of the signal data streams, each trend representing a change between at least two signal data points in the respective signal data stream; and
    determining at least one pattern in the plurality of the signal data streams based on the series of trends, wherein the at least one pattern comprises a first sequence of trends representing a first event associated with the industrial process, a second sequence of trends representing a second event associated with the industrial process, and a time delay between the first event and the second event; and
    predicting an occurrence of the second event using the determined at least one pattern.

12. The method of claim 11, wherein the at least one pattern is determined based on a detected correlation between the first and second sequences of trends in the plurality of signal data streams.

13. The method of claim 12, wherein the correlation between the first and second sequences of trends is detected based on the time delay.

14. The method of claim 13, wherein the first sequence of trends and the second sequence of trends are detected by the data mining utility to be correlated if: each of the first and the second sequences of trends occurs at least twice, and that each time the occurrence of the second sequence of trends is delayed from the respective occurrence of the first sequence of trends by the time delay.

15. The method of claim 12, wherein the at least one pattern is determined based on a pre-determined value representing a threshold of statistical interdependence between the first and second sequences of trends in the plurality of signal data streams.

16. The method of claim 11, further comprising receiving user inputs and controlling the industrial process, using the series of trends of each of the plurality of signal data streams and the at least one pattern.

17. The method of claim 16, further comprising generating one or more of: alert, log and report.

18. The method of claim 11, wherein the series of signal data points is received from the one or more sensors at predetermined time intervals and each of the first and second sequences of trends is defined by a plurality of signal data points at consecutive time intervals.

19. The method of claim 11, wherein the trend representing a change between the at least two signal data points in the respective signal data stream comprises a slope defined by the at least two signal data points.

20. The method of claim 11, wherein the trend comprises one of: up, down, and flat.

\* \* \* \* \*